United States Patent
Otsubo et al.

(10) Patent No.: US 10,281,586 B2
(45) Date of Patent: May 7, 2019

(54) TRANSMISSION DATA FOR FLIGHT CHECK

(71) Applicant: THALES USA, INC., Arlington, VA (US)

(72) Inventors: Tom Otsubo, Oak Grove, MO (US); Richard Mullin, Shawnee, KS (US)

(73) Assignee: THALES USA, INC., Arlington, VA (US)

( * ) Notice: Subject to any disclaimer, the term of this patent is extended or adjusted under 35 U.S.C. 154(b) by 70 days.

(21) Appl. No.: 15/479,988

(22) Filed: Apr. 5, 2017

(65) Prior Publication Data

US 2017/0293034 A1   Oct. 12, 2017

Related U.S. Application Data (60) Provisional application No. 62/319,667, filed on Apr. 7, 2016.

(51) Int. Cl.
| | |
|---|---|
| *G01S 19/31* | (2010.01) |
| *G08G 5/00* | (2006.01) |
| *H04B 7/185* | (2006.01) |
| *G08G 5/02* | (2006.01) |

(52) U.S. Cl.
CPC .......... *G01S 19/31* (2013.01); *G08G 5/0013* (2013.01); *G08G 5/0026* (2013.01); *G08G 5/025* (2013.01); *H04B 7/18506* (2013.01)

(58) Field of Classification Search
CPC .... G01S 19/31; G08G 5/0013; H04B 7/18506
See application file for complete search history.

(56) References Cited

U.S. PATENT DOCUMENTS

| | | | |
|---|---|---|---|
| 5,884,223 A * | 3/1999 | Tognazzini | G08G 5/0021 340/961 |
| 6,469,654 B1 | 10/2002 | Winner et al. | |
| 6,690,296 B2 * | 2/2004 | Corwin | G01S 13/782 340/945 |
| 7,764,224 B1 * | 7/2010 | Anderson | G01S 19/215 342/357.27 |
| 9,056,679 B1 * | 6/2015 | Langston | B64D 1/12 |
| 9,948,380 B1 * | 4/2018 | Vos | H04B 7/18506 |
| 2007/0244608 A1 | 10/2007 | Rath et al. | |
| 2007/0252748 A1 * | 11/2007 | Rees | H01Q 1/28 342/29 |

(Continued)

FOREIGN PATENT DOCUMENTS

| | | | |
|---|---|---|---|
| WO | WO 2007/086899 A2 | | 8/2007 |
| WO | WO2007086899 | * | 8/2007 |

OTHER PUBLICATIONS

International Search Report and Written Opinion of International Patent Application No. PCT/US2017/026429 dated Jun. 19, 2017.

*Primary Examiner* — Mussa A Shaawat
(74) *Attorney, Agent, or Firm* — Sage Patent Group (57) ABSTRACT

A method, system, and computer-readable medium for performing a flight check of one or more navigational aid systems. Aspects include obtaining, using an aircraft, first information associated with an accuracy of signals transmitted by a localizer. Aspects also include obtaining, using the aircraft, second information associated with an accuracy of signals transmitted by a glide slope station. Aspects also include transmitting the first information and the second information to a ground receiver for processing.

15 Claims, 6 Drawing Sheets

(56) References Cited

U.S. PATENT DOCUMENTS

| | | | |
|---|---|---|---|
| 2008/0027594 A1* | 1/2008 | Jump | G05D 1/101 |
| | | | 701/11 |
| 2012/0265376 A1 | 10/2012 | Fleiger-Holmes et al. | |
| 2013/0345905 A1 | 12/2013 | Parthasarathy | |
| 2015/0336667 A1* | 11/2015 | Srivastava | B64C 39/024 |
| | | | 701/2 |
| 2016/0057032 A1* | 2/2016 | Tieftrunk | G01C 21/00 |
| | | | 701/533 |
| 2016/0065497 A1* | 3/2016 | Coulmeau | H04L 47/821 |
| | | | 709/203 |
| 2017/0039510 A1* | 2/2017 | Ogilvie | G06Q 10/0832 |
| 2018/0032088 A1* | 2/2018 | van Cruyningen | B64C 39/024 |

* cited by examiner

TRANSMISSION DATA FOR FLIGHT CHECK

CROSS-REFERENCE TO RELATED APPLICATIONS

This application claims priority to U.S. Provisional Application No. 62/319,667 filed on Apr. 7, 2016, the contents of which are hereby incorporated herein in their entirety.

TECHNICAL FIELD

The present disclosure relates generally to the field of avionics, and more specifically to devices, systems, and methods for transmitting flight check data for one or more navigational aid systems using a manned or unmanned aircraft.

BACKGROUND

Pilots generally rely on very high frequency (VHF) omni-directional range (VOR) navigation systems, instrument landing systems (ILSs), and/or distance measuring equipment (DME) to aid with navigation and landing when flying during periods of low visibility or inclement weather. Generally, a VOR system is implemented by dispersing VOR transmitter facilities across a geographic area. VOR receivers, located on the aircraft, receive signals from VOR transmitters and help guide the aircraft through such geographic areas. The basic principle of operation of the VOR navigation system may include the VOR transmitter transmitting two signals at the same time. One VOR signal may be transmitted constantly in all directions, while another signal is rotatably transmitted about the VOR transmission facility. The airborne VOR receiver receives both signals, analyzes the phase difference between the two signals, and interprets the results as a radial to or from the VOR transmitter. Thus, the VOR navigation system allows a pilot to simply, accurately, and without ambiguity navigate from VOR transmitter facility to VOR transmitter facility. Each VOR transmission facility operates at a frequency that is different from the surrounding VOR transmitters. Therefore a pilot may tune the aircraft VOR receiver to the VOR transmission facility with respect to which navigation is desired.

The ILS is a ground-based instrument approach system that provides aircraft with lateral guidance (e.g., from localizer antenna array) and vertical guidance (e.g., glide slope antenna array) while approaching and landing on a runway. In principle, an aircraft approaching a runway is guided by ILS receivers in the aircraft that perform modulation depth comparisons of signals transmitted by a localizer antenna array located at the end of the runway and by a glide slope antenna array located to one side of the runway touchdown zone.

Generally speaking, two signals are transmitted by the localizer from co-located antennas within the array. One signal is modulated at a first frequency (e.g., 90 Hz), while the other signal is modulated at a second frequency (e.g., 150 Hz). Each of the co-located antennas transmits a narrow beam, one slightly to the left of the runway centerline, the other slightly to the right of the runway centerline. The localizer receiver in the aircraft measures the difference in the depth of modulation (DDM) of the first signal (e.g., 90 Hz) and the second signal (e.g., 150 Hz). The depth of modulation for each of the modulating frequencies is 20 percent when the receiver is on the centerline. The difference between the two signals varies depending on the deviation of the approaching aircraft from the centerline. The pilot controls the aircraft so that a localizer indicator (e.g., cross hairs) in the aircraft remains centered on the display to provide lateral guidance.

Similarly, the glide slope (GS) antenna array transmits a first signal modulated at a first frequency (e.g., 90 Hz) and a second signal modulated at a second frequency (e.g., 150 Hz). The two GS signals are transmitted from co-located antennas in the GS antenna array. The center of the GS signal is arranged to define a glide path of a predetermined slope (e.g., 3°) above the ground level for the approach of the aircraft. The pilot controls the aircraft so that a guide slope indicator (e.g., cross hairs) remains centered on the display to provide vertical guidance during landing.

In aviation, the basic objective for flight inspection of the various navigation aid systems has remained much the same for the last half a century. For example, flight inspection services (FIS) are provided by an agency such as the Federal Aviation Administration (FAA), and provide airborne flight check of electronic signals-in-space from ground-based navigational aid equipment that support aircraft departure, en-route, and arrival flight procedures. The flight check are conducted by a crew using a fleet of specially-equipped flight inspection aircraft.

Currently, for example, there are various flight maneuvers that must be performed by a flight inspection crew as part of a flight inspection of the various navigation aid systems. Each navigation aid system is inspected periodically, and requires an aircraft fleet that is expensive to maintain, an inspection crew to fly and maintain the aircrafts, ten or more hours of flight time to accomplish, and appropriate weather to perform the flight maneuvers (e.g., not too windy and with good visibility).

Therefore, there exists an unmet need in the art for methods, apparatuses, and computer-readable media to perform the flight maneuvers required to inspect navigational aid systems that reduces the expense of maintaining a fleet of aircraft, commissioning a crew, and which allow the maneuvers to be performed under less than ideal weather conditions.

SUMMARY

Aspects of the present invention relate to methods, systems, and computer-readable media for performing a flight check of one or more navigational aid systems. Aspects include obtaining, using an aircraft, first information associated with an accuracy of signals transmitted by a localizer. Aspects also include obtaining, using the aircraft, second information associated with an accuracy of signals transmitted by a glide slope station. Aspects further include transmitting the first information and the second information to a ground receiver for processing to increase an accuracy of the one or more navigational aid measurements.

Additional aspects may include receiving, from an aircraft, first information associated with an accuracy of signals transmitted by a localizer. Additional aspects may also include receiving, from the aircraft, second information associated with an accuracy of signals transmitted by a glide slope station. Additional aspects may further include receiving location information associated with a position of the aircraft. Additional aspects may include determining the accuracy of the signals transmitted by the localizer based on the first information and the location information. Additional aspects may further include determining the accuracy of the signals transmitted by the glide slope station based on the second information and the location information.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a method of performing a flight check of navigational aid systems using an unmanned aircraft will now be presented with reference to various methods, apparatuses, and media. These methods, apparatuses, and media will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, discrete radio frequency (RF) circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, include CD, laser disc, optical disc, digital versatile disc (DVD), and floppy disk, where disks usually reproduce data magnetically, while discs reproduce data optically with lasers. Combinations of the above should also be included within the scope of computer-readable media.

Aspects of a method, apparatus, and computer-readable medium presented herein may be compatible with unmanned aircraft used in performing a flight check. For example, the method, apparatus, and computer-readable medium may be compatible for performing a flight check with one or more of the following: ILS, VOR, TACtical Air Navigation (TACAN), automatic dependent surveillance-broadcast (ADS-B), Marker Beacons (MB), Non-Directional Beacons (NDB), ground-based augmentation system (GBAS), Lighting Systems, and/or airport/aircraft communications, radar, and/or charts. Although the description set forth below primarily refers to a flight check procedure for an ILS, VOR, and/or DME it should be understood that the methods, apparatuses, and computer-readable media of the present disclosure may be used with any of the foregoing navigation aid systems listed above without departing from the scope of the present disclosure.

Currently, there are various flight maneuvers that must be performed by a flight inspection crew as part of a flight inspection of the various navigation aid systems. Each navigation aid system is inspected on a scheduled basis, and requires an aircraft fleet that is expensive to maintain, an inspection crew to fly and maintain the aircrafts, ten or more hours of flight time to accomplish, and appropriate weather to perform the flight maneuvers (e.g., not too windy and with good visibility). In order to ensure the accuracy of navigation aid systems while reducing the cost and time of performing flight checks of the various navigation aid systems, the present disclosure provides a method for moving the storage and processes of data collected during a flight check from the aircraft to the ground.

The data collected while performing a flight check is referred to as checklist data. Checklist data is defined in the US Standard Flight Inspection Manual (FAA Order 8200.1, October 2005) as the minimum data to be verified during a flight check of a navigation system. Currently this data may be stored and processed using equipment in an aircraft. According to the present disclosure, the measured data from the flight check process may be sent to a ground processing system. This may reduce the weight and complexity in aircraft used to inspect navigational aid systems, and potentially accelerate the data processing time. These aspects of the present disclosure may be useful for a small un-manned flight check aircraft, but may also have benefits for manned aircraft.

Figure 1:
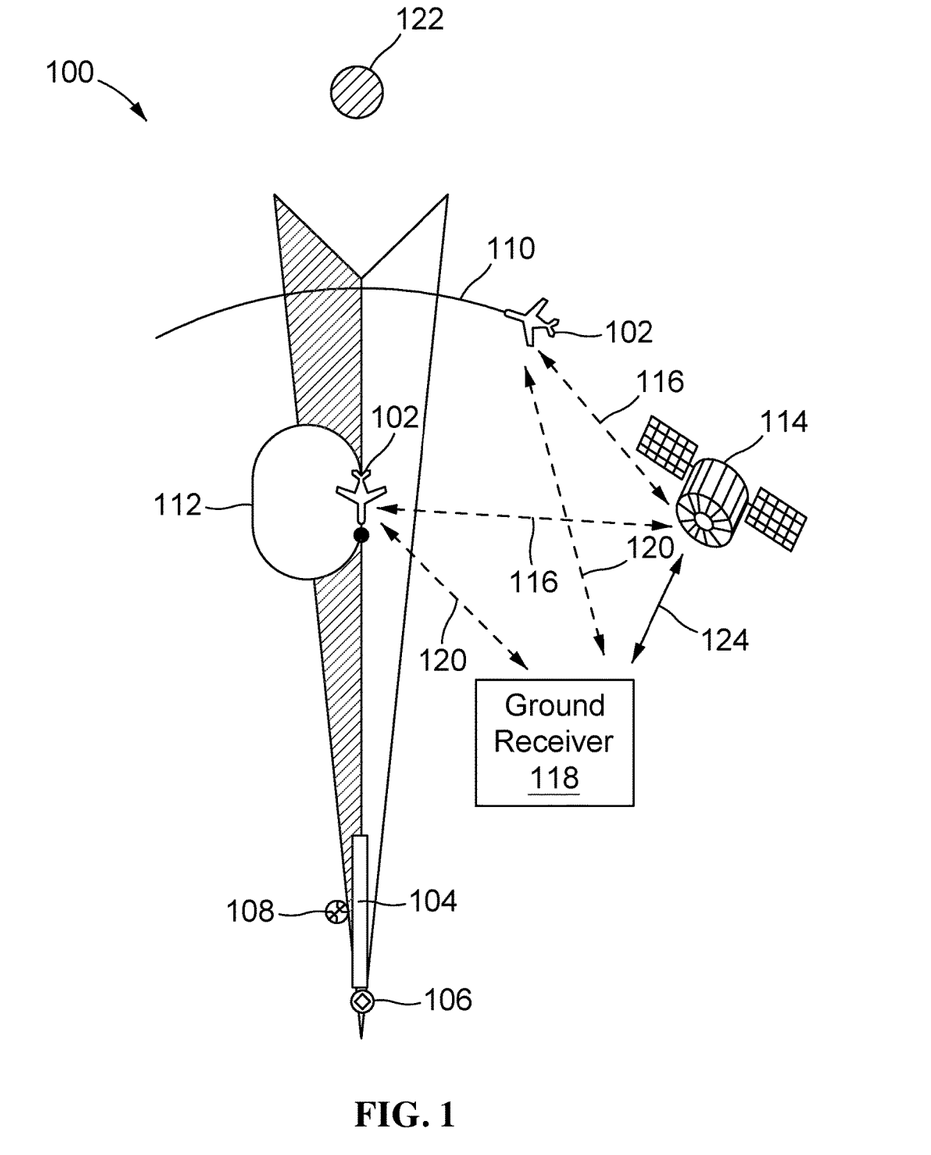
FIG. 1 is a diagram illustrating one example of a system in accordance with various aspects of the present disclosure.

FIG. 1 illustrates an overall system diagram of an example navigation aid testing system 100 for use in accordance with aspects of the present disclosure. The example system of FIG. 1 includes, for example, an unmanned aircraft 102 (e.g., shown on two example paths 110, 112), a runway 104, a localizer 106, a glide slope station 108, a GPS satellite 114, a ground receiver 118, and a VOR station 122. In one aspect, the manned or unmanned aircraft 102 may be configured to learn a flight path for one or more airports depending on the navigational aid systems in use at those airports. For example, the navigational aid systems may include one or more of an ILS, VOR, DME, TACAN, ADS-B, MB, NDB, and GBAS. An ILS may include a localizer, sometimes a glideslope and sometimes a DME. In another aspect, the unmanned aircraft 102 may be a battery powered quadcopter or other drone.

In accordance with an example embodiment, the unmanned aircraft 102 is able to test navigation aid systems (e.g., such as an ILS) by crossing via a first path 110 the ILS localizer course perpendicular to the normal direction of flight at a certain distance (e.g., 10 miles) from the airport. In an aspect, the unmanned drone 102 may be kept at a constant altitude (e.g., 2,000 ft) above the ground. During this check, first information associated with an accuracy of signals transmitted by the localizer 106 may be obtained by measuring the width of the transmitted localizer course (e.g., the two signals transmitted by the localizer 106) using the unmanned aircraft 102. The unmanned aircraft 102 may transmit 120a the first information associated with the accuracy of the two localizer signals to a ground receiver 118 for processing. The ground receiver 118 may determine the accuracy of the two signals transmitted by the localizer 106 using the first information received from the unmanned aircraft 102. In addition, the unmanned aircraft 102 may obtain positioning information 116 (e.g., one or more of location information, speed information, heading information, or altitude information) received from the GPS satellite 114 and transmit the location information 120a to the ground receiver 118. For example, the ground receiver 118 may determine the accuracy of the two signals transmitted by the localizer 106 based on positioning information 124 received from the GPS satellite 114. Alternatively, since the ground receiver 118 knows a starting position of the flight check, a speed of travel, and a direction of travel, the ground receiver 118 may determine the accuracy of the two signals transmitted by the localizer 106 without receiving location information (via transmissions 120a, 124) from the unmanned aircraft 102 and/or the GPS satellite 114. This process may ensure that a pilot will always receive correct localizer guidance during landing procedure.

In accordance with another example embodiment, the unmanned aircraft 102 is able to test the navigation aid system (e.g., such as an ILS) by placing the unmanned aircraft 102 on a level run along a second path 112 at a constant altitude (e.g., 2,000 ft) above the ground flying along the glide slope course toward the airport. This level run on the second path 112 may be made to check the glide slope station 108 of the navigational aid system and measure the actual width of the transmitted signals from the glide slope station 108, which guides aircraft pilot through a descent to the runway. In an aspect, the unmanned aircraft 102 may obtain second information associated with the accuracy of the two signals transmitted by the glide slope station 108. During this check, second information associated with an accuracy of signals transmitted by the glide slope station 108 may be obtained by measuring the width of the transmitted signals (e.g., the two signals transmitted by the glide slope station 108) using the unmanned aircraft 102. The second information obtained by the unmanned aircraft 102 may be transmitted to the ground receiver 118 for processing. In one aspect, the first information and the second information may be transmitted 120b together to the ground receiver 118. In another aspect, the first information and the second information may be transmitted 120b separately to the ground receiver 118. In one example embodiment, the unmanned aircraft 102 may receive location information from the GPS satellite 114 that may be used in determining an accuracy of the two signals transmitted by the glide slope station 108. The location information may be transmitted 120b by the unmanned aircraft 102 to the ground receiver 118 with the first information and the second information. Alternatively, the location information may be separately transmitted to the ground receiver 118. For example, the ground receiver 118 may determine the accuracy of the two signals transmitted by the glide slope station 108 based on positioning information 116 received from one or more of the unmanned aircraft 102 and/or the GPS satellite 114. This process may ensure that a pilot will always receive correct glide slope guidance during a landing procedure.

Still further, in an example embodiment, the unmanned aircraft 102 is able to test the navigation aid system (e.g., such as a VOR, DME, or ADS-B) by crossing via the first path 110 the VOR, DME, or ADS-B perpendicular, parallel, or at an angle to the normal direction of flight at a certain distance (e.g., 10 miles) from the airport. During this check, third information is transmitted 120a that is associated with an accuracy of signals transmitted by the VOR station 122 (or DME or ADS-B stations) may be obtained by receiving the two signals from the VOR station 122 and analyzing the phase difference between the two signals. The unmanned aircraft 102 may interpret the results as a radial to or from the VOR station 122 (or DME or ADS-B stations). The unmanned aircraft 102 may transmit 120a the third information associated with the accuracy of the two VOR signals to the ground receiver 118 for processing. Alternatively, the third information may be transmitted 120a to the ground receiver 118 without being analyzed by the unmanned aircraft 102. In this alternatively example, the ground receiver 118 may analyze the phase difference between the two signals and interpret the results as a radial to or from the VOR station 122 (or DME or ADS-B stations). In addition, the unmanned aircraft 102 may obtain positioning information 116 (e.g., location information, speed information, heading information, or altitude information) received from the GPS satellite 114 that is also transmitted 120a to the ground receiver 118. The ground receiver 118 may determine accuracy of the two signals transmitted by the VOR station 122 using the third information 120 and the location information 116 received from the unmanned aircraft 102.

Alternatively, since the ground receiver 118 may have received information for a starting position of the flight check, a speed of travel, and a direction of travel, the ground receiver 118 may determine the accuracy of the two signals transmitted by the VOR station based on the third information without receiving location information from the unmanned aircraft 102 and/or the GPS satellite 114. This process may ensure that a pilot will always receive correct localizer guidance during landing procedure.

In accordance with a further example embodiment, the unmanned aircraft 102 may fly the complete navigational aid system approach procedure to the runway 104. This approach procedure may maneuver the unmanned aircraft 102 just above the runway so that both ends of the runway may be visually marked by sensors on the unmanned aircraft 102. The visual markings may be way-points of a GBAS at the airport that the unmanned aircraft 102 transmits to the ground receiver 118. The ground receiver 118 may be able to develop and/or validate an existing GBAS airport waypoints using the information associated with the visual markings received from one or more of the unmanned aircraft 102.

In this way, the unmanned aircraft 102 and the ground receiver 118 of the present disclosure is able to test navigational aid systems, localizer signals, glide slope signals, VOR, and DME coverage, which would otherwise not be possible using ordinary ground check equipment and procedures. The ground receiver 118 of the present disclosure is also able to develop and/or validate GBAS airport waypoints with its included precision GPS capabilities. When used in conjunction with location information, differential corrections of the localizer signals, glide slope signals, VOR signals, and/or DME signals using location information may ensure enhanced accuracy during the flight check procedure. As a flight check tool, the unmanned aircraft 102 and the ground receiver 118 is able to reduce the cost of the overall commissioning of the runway equipment, the aircraft fleet, and the flight crew. By eliminating the need for humans to man the aircraft, the unmanned aircraft 102 and the ground receiver 118 of the present disclosure not only greatly reduces the cost of flight checks, but allows flight checks to be performed under situations previously considered cost prohibitive.

Figure 2:
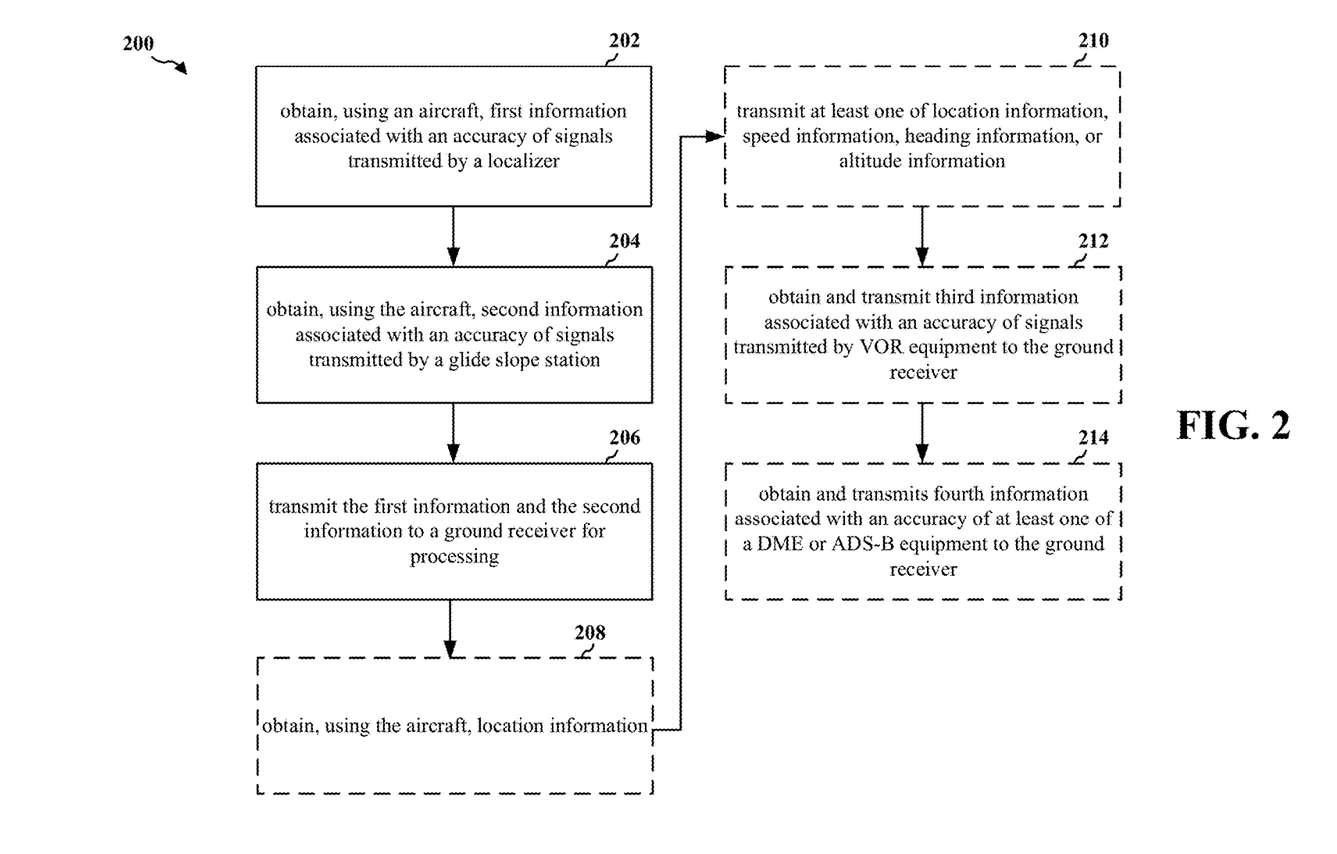
FIG. 2 is a flow diagram illustrating an example method for performing a flight check of one or more navigational aid systems in accordance with various aspects of the present disclosure.

FIG. 2 is a flow diagram illustrating an example method 200 for performing a flight check of one or more navigational aid systems in accordance with various aspects of the present disclosure. The process described in this flow diagram may be implemented and/or performed by an unmanned aircraft, such as the unmanned aircraft 102 illustrated in FIG. 1. For example, in FIG. 1, the unmanned aircraft 102 may include a drone, an unmanned aerial vehicle (UAV), and/or a battery operated quadcopter. In an aspect, as shown in FIG. 1, the unmanned aircraft 102 may be self-flying, meaning that the flight check may be performed without or with minimal human interaction. In an alternative aspect, as shown in FIG. 1, a user may remotely control the unmanned aircraft 102 for at least a portion of the flight check. It should be understood that the operations indicated with dashed lines represent optional operations for various aspects of the disclosure.

At block 202, the unmanned aircraft may obtain first information associated with an accuracy of signals transmitted by a localizer. For example, referring to FIG. 1, first information associated with an accuracy of signals transmitted by the localizer 106 may be obtained by measuring the width of the transmitted localizer course (e.g., the two signals transmitted by the localizer 106) using the unmanned aircraft 102.

At block 204, the unmanned aircraft may obtain second information associated with an accuracy of signals transmitted by a glide slope station. For example, referring to FIG. 1, second information associated with an accuracy of signals transmitted by the glide slope station 108 may be obtained by measuring the width of the transmitted signals (e.g., the two signals transmitted by the glide slope station 108) using the unmanned aircraft 102.

At block 206, the unmanned aircraft may transmit the first information and the second information to a ground receiver for processing. For example, referring to FIG. 1, the first information and the second information obtained by the unmanned aircraft 102 may be transmitted to the ground receiver 118 for processing. In one aspect, as shown in FIG. 1, the first information and the second information may be transmitted together to the ground receiver 118. In another aspect, as shown in FIG. 1, the first information and the second information may be transmitted separately to the ground receiver 118.

At block 208, the unmanned aircraft may obtain location information. For example, referring to FIG. 1, the unmanned aircraft 102 may receive location information from the GPS satellite 114 that may be used in determining an accuracy of the two signals transmitted by the glide slope station 108.

At block 210, the unmanned aircraft may transmit at least one of location information, speed information, heading information, or altitude information. For example, referring to FIG. 1, the unmanned aircraft 102 may receive at least one of location information, speed information, heading information, or altitude information from the GPS satellite 114 that may be used in determining an accuracy of the two signals transmitted by the glide slope station 108. As shown in FIG. 1, the at least one of location information, speed information, heading information, or altitude information may be transmitted by the unmanned aircraft 102 to the ground receiver 118 with the first information and the second information.

At block 212, the unmanned aircraft may obtain and transmit third information associated with an accuracy of signals transmitted by VOR equipment to the ground receiver. For example, referring to FIG. 1, third information may be obtained by receiving the two signals from the VOR station 122 and analyzing the phase difference between the two signals. As further shown in FIG. 1, the unmanned aircraft 102 may interpret the results as a radial to or from the VOR station 122. In FIG. 1, the unmanned aircraft 102 may transmit 120a the third information associated with the accuracy of the two VOR signals to a ground receiver 118 for processing.

At block 214, the unmanned aircraft may obtain measurements from least one of a DME or ADS-B equipment and transmit information associated with the measurements to the ground receiver. For example, referring to FIG. 1, third information associated with an accuracy of signals transmitted by DME or ADS-B stations may be obtained by receiving the two signals from the VOR station 122 and analyzing the phase difference between the two signals.

Figure 3:
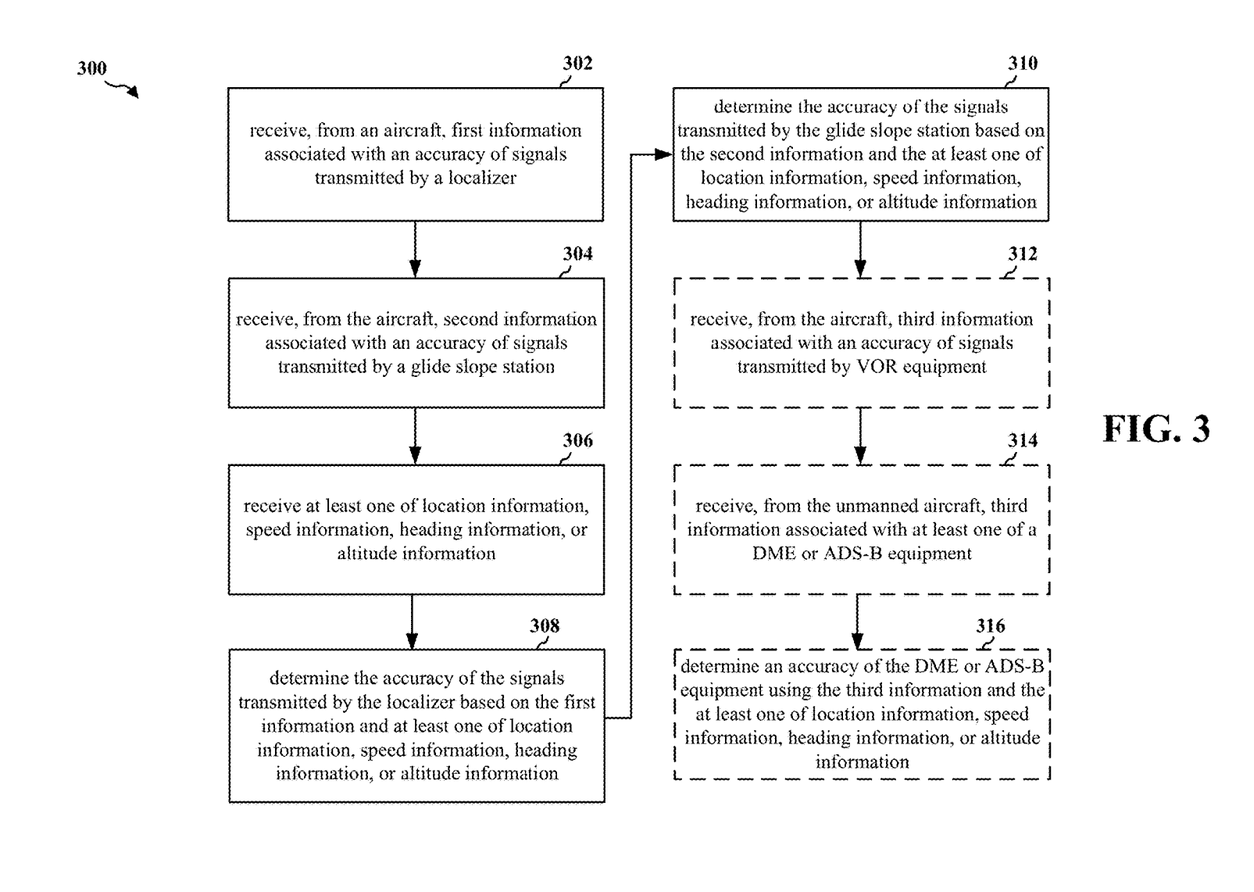
FIG. 3 is a flow diagram illustrating an example method for performing a flight check of one or more navigational aid systems in accordance with various aspects of the present disclosure.

FIG. 3 is a flow diagram illustrating an example method 300 for performing a flight check of one or more navigational aid systems in accordance with various aspects of the present disclosure. The process described in this flow diagram may be implemented and/or performed by a ground receiver, such as the ground receiver 118 illustrated in FIG. 1. For example, in FIG. 1, the ground receiver 118 may include one or more processors that analyze signals received from one or more of the unmanned aircraft 102 and/or the GPS satellite 114. It should be understood that the operations indicated with dashed lines in FIG. 3 represent optional operations for various aspects of the disclosure.

At block 302, the ground receiver may receive first information associated with an accuracy of signals transmitted by a localizer. For example, referring to FIG. 1, first information associated with an accuracy of signals transmitted by the localizer 106 may be obtained by measuring the width of the transmitted localizer course (e.g., the two signals transmitted by the localizer 106) using the unmanned aircraft 102. The first information and the second information obtained by the unmanned aircraft 102, as shown in FIG. 1, may be transmitted to the ground receiver 118 for processing. In one aspect, as shown in FIG. 1, the first information and the second information are transmitted together to the ground receiver 118. In another aspect, as shown in FIG. 1, the first information and the second information are transmitted separately to the ground receiver 118.

At block 304, the ground receiver may receive, from the aircraft, second information associated with an accuracy of signals transmitted by a glide slope station. For example, referring to FIG. 1, second information associated with an accuracy of signals transmitted by the glide slope station 108 may be obtained by measuring the width of the transmitted signals (e.g., the two signals transmitted by the glide slope station 108) using the unmanned aircraft 102. As further shown in FIG. 1, the first information and the second information obtained by the unmanned aircraft 102 may be transmitted to the ground receiver 118 for processing. In one aspect, as shown in FIG. 1, the first information and the second information may be transmitted together to the ground receiver 118. In another aspect, as shown in FIG. 1, the first information and the second information may be transmitted separately to the ground receiver 118.

At block 306, the ground receiver may receive at least one of location information, speed information, heading information, or altitude information associated with a position of the aircraft. For example, referring to FIG. 1, the unmanned aircraft 102 may receive at least one of location information, speed information, heading information, or altitude information from the GPS satellite 114 that may be used in determining an accuracy of the two signals transmitted by the glide slope station 108. The at least one of location information, speed information, heading information, or altitude information may be transmitted 120a by the unmanned aircraft 102 to the ground receiver 118 with the first information and the second information, as shown in FIG. 1. Alternatively, the at least one of location information, speed information, heading information, or altitude information may be separately transmitted to the ground receiver 118. The location information 124 may be received at the ground receiver 118 from the GPS satellite 114, as further shown in FIG. 1.

At block 308, the ground receiver may determine the accuracy of the signals transmitted by the localizer based on the first information and at least one of location information, speed information, heading information, or altitude information. For example, referring to FIG. 1, ground receiver 118 may determine the accuracy of the two signals transmitted by the localizer 106 based on positioning information 124 received from the GPS satellite 114 positioning information 120a received from the GPS satellite 114.

At block 310, the ground receiver may determine the accuracy of the signals transmitted by the glide slope station based on the second information and the at least one of location information, speed information, heading information, or altitude information received from the aircraft. For example, referring to FIG. 1, the ground receiver 118 may determine the accuracy of the two signals transmitted by the glide slope station 108 based on positioning information 116 received from one or more of the unmanned aircraft 102 and/or the GPS satellite 114.

At block 312, the ground receiver may receive, from the aircraft, third information associated with an accuracy of signals transmitted by VOR equipment. For example, referring to FIG. 1, third information may be obtained by the unmanned aircraft 102 by receiving the two signals from the VOR station 122 and analyzing the phase difference between the two signals. As further shown in FIG. 1, the unmanned aircraft 102 may interpret the results as a radial to or from the VOR station 122. As shown in FIG. 1, the unmanned aircraft 102 may transmit 120a the third information associated with the accuracy of the two VOR signals to a ground receiver 118 for processing. Alternatively, for example, as shown in FIG. 1, the unmanned aircraft 102 may transmit 120a the third information to the ground receiver 118 without analyzing the phase difference between the two signals and/or interpreting the results as a radial to or from the VOR station 122.

At block 314, the ground receiver may receive, from the aircraft, third information associated with at least one of a DME or ADS-B equipment. For example, referring to FIG. 1, third information associated with an accuracy of signals transmitted by DME or ADS-B stations may be determined by receiving the two signals from the VOR station 122 and analyzing the phase difference between the two signals. As further shown in FIG. 1, the unmanned aircraft 102 and/or ground receiver 118 may interpret the results as a radial to or from the DME or ADS-B stations.

At block 316, the ground receiver may determine an accuracy of the DME or ADS-B equipment using the third information and the at least one of location information, speed information, heading information, or altitude information received from the aircraft. For example, referring to FIG. 1, ground receiver 118 may determine accuracy of the two signals transmitted by the DME or ADS-B stations using the third information received via transmission 120a and the at least one of location information, speed information, heading information, or altitude information 116 received from the unmanned aircraft 102.

Figure 4:
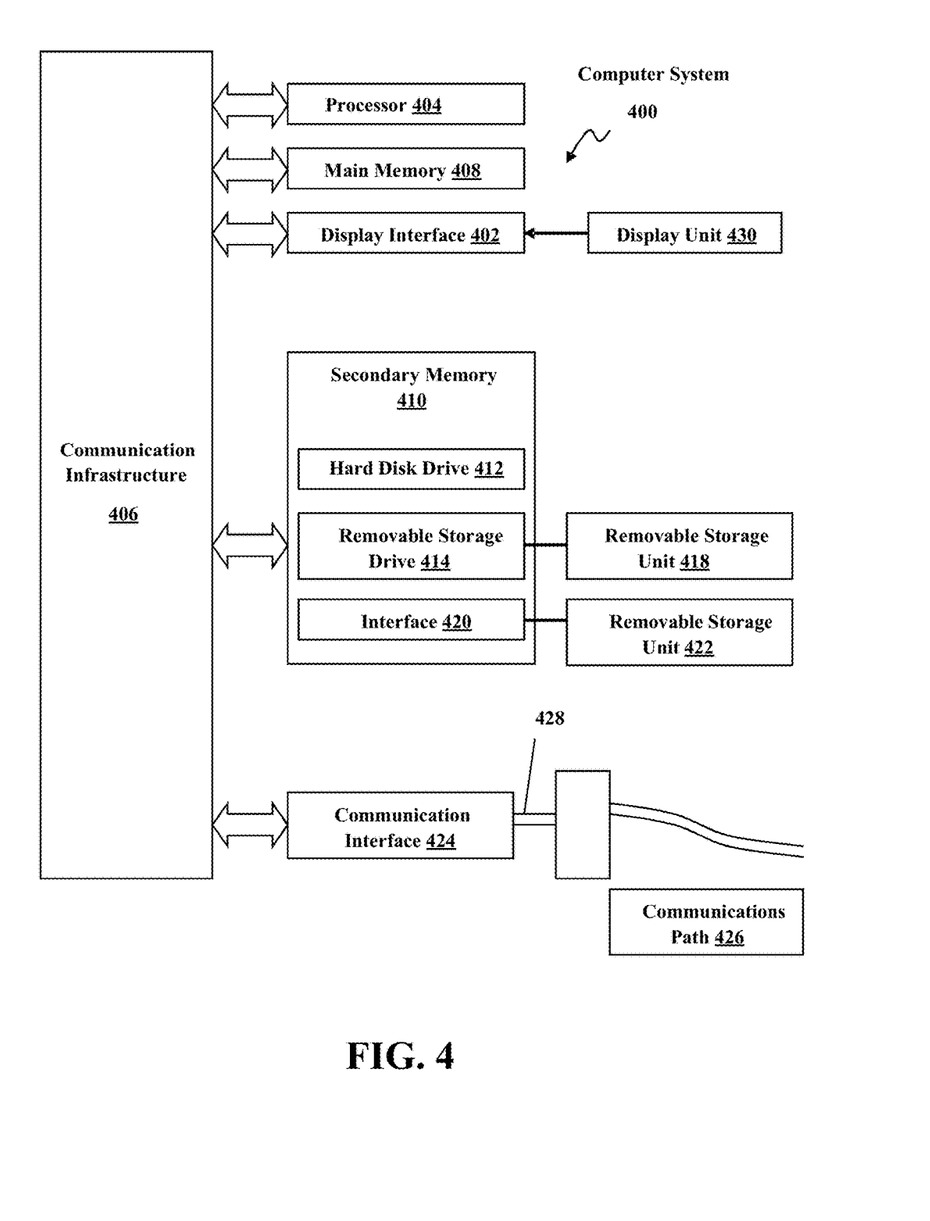
FIG. 4 a system diagram illustrating various example hardware components and other features, for use in accordance with aspects of the present disclosure.
Figure 5:
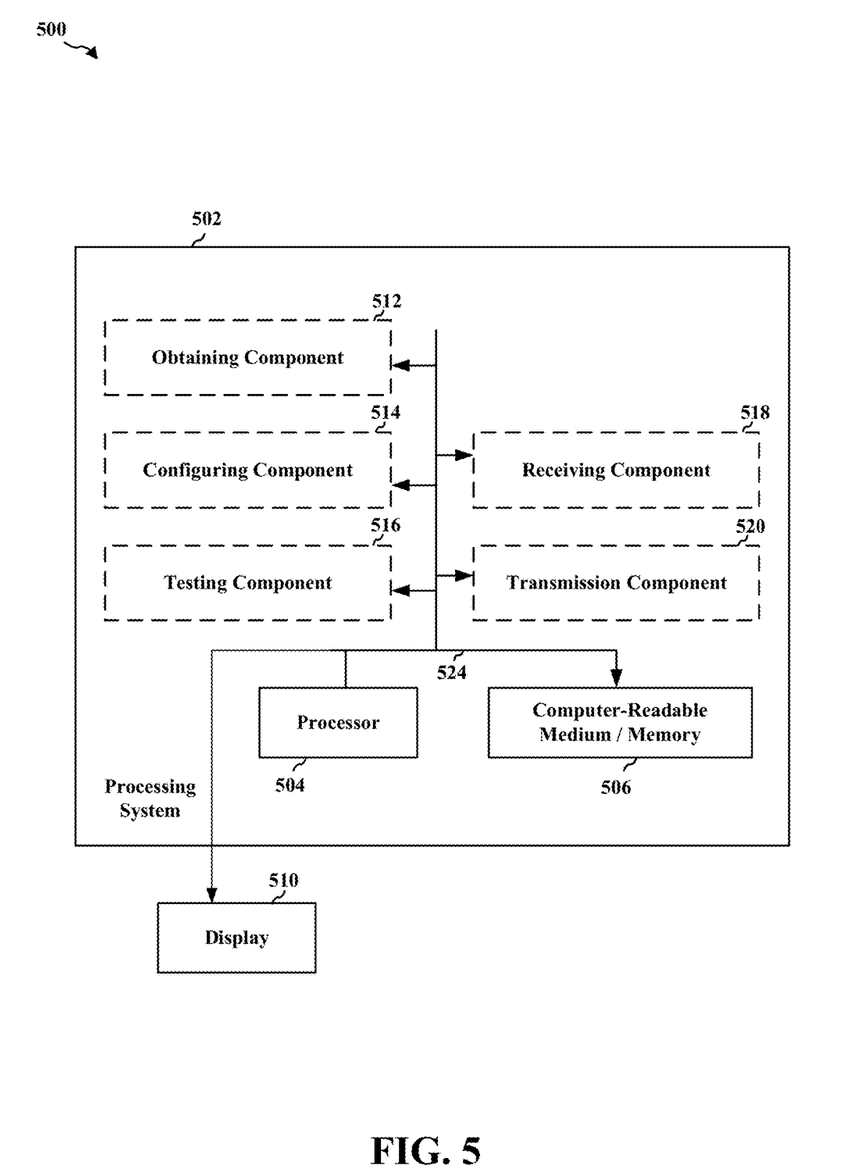
FIG. 5 is a diagram illustrating example aspects of a hardware implementation for a system employing a processing system in accordance with aspects of the present disclosure.
Figure 6:
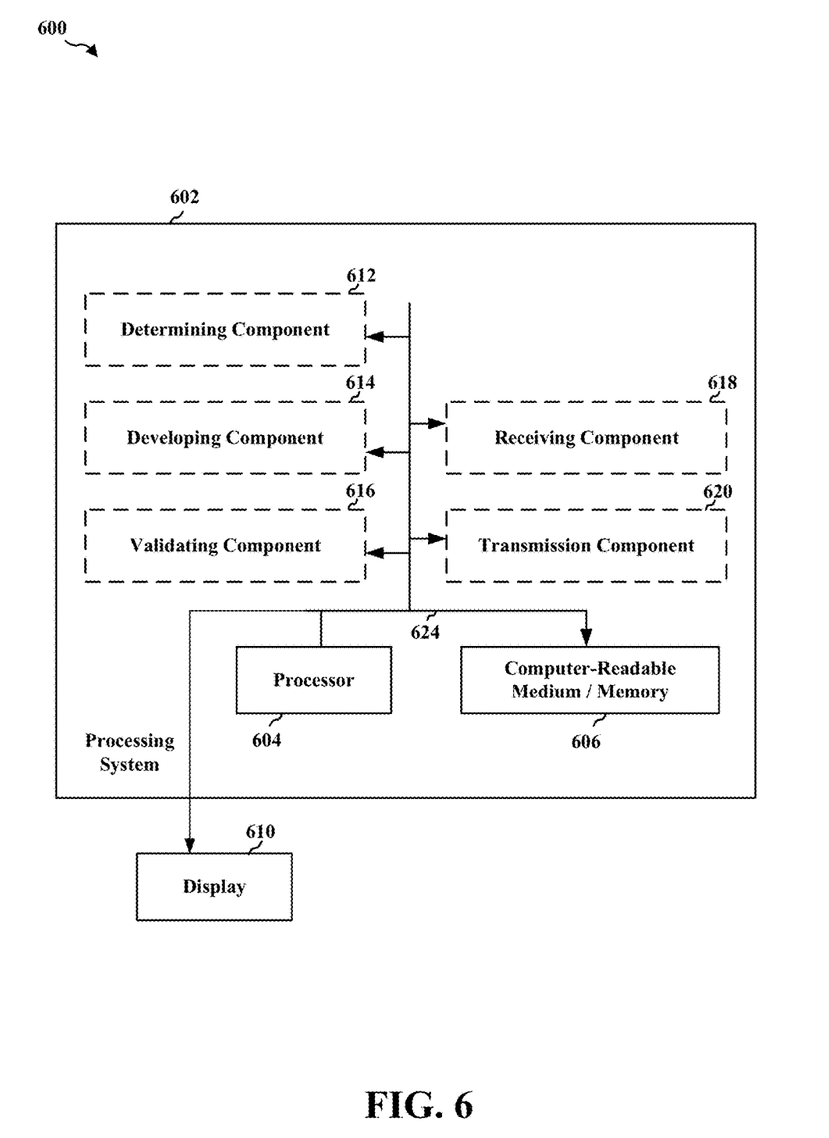
FIG. 6 is a diagram illustrating example aspects of a hardware implementation for a system employing a processing system in accordance with aspects of the present disclosure.

FIG. 4 is an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIGS. 2 and 3. An example of such a computer system 500, 600 is shown in FIGS. 5 and 6.

In FIG. 4, computer system 400 includes one or more processors, such as processor 404. For example, the processor 404 may be configured for signal processing at an unmanned aircraft and/or ground receiver. The processor 404 is connected to a communication infrastructure 406 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 400 may include a display interface 402 that forwards graphics, text, and other data from the communication infrastructure 406 (or from a frame buffer not shown) for display on a display unit 430. In an aspect, the display unit 430 may be included in an unmanned aircraft. In another aspect, the display unit 430 may be located in the ground receiver and configured to display data and/or measurements obtained using the unmanned aircraft. Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, wireless communications link, a radio frequency (RF) link and/or other communications channels. In this document, the terms "computer program medium" and "computer usable medium" are used to refer generally to media such as a removable storage drive 480, a hard disk installed in hard disk drive 412, and signals 428. These computer program products provide software to the computer system 400. Aspects presented herein may include such computer program products.

Computer programs (also referred to as computer control logic) are stored in main memory 408 and/or secondary memory 410. Computer programs may also be received via communications interface 424. Such computer programs, when executed, enable the computer system 400 to perform the features presented herein, as discussed herein. In particular, the computer programs, when executed, enable the processor 410 to perform the features described supra with respect to FIGS. 1, 2, and 3. Accordingly, such computer programs represent controllers of the computer system 400.

In aspects implemented using software, the software may be stored in a computer program product and loaded into computer system 400 using removable storage drive 414, hard drive 412, or communications interface 420. The control logic (software), when executed by the processor 404, causes the processor 404 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

FIG. 5 is a representative diagram illustrating an example hardware implementation for a system 500 employing a processing system 502. The processing system 502 may be implemented with an architecture that links together various circuits, including, for example, one or more processors and/or components, represented by the processor 504, the components 512, 514, 516, 518, 520 and the computer-readable medium/memory 506.

The processing system 502 may be coupled to or connected with an unmanned aircraft that is in communication with a ground receiver.

The processing system 502 may include a processor 504 coupled to a computer-readable medium/memory 506 via bus 524. The processor 504 may be responsible for general processing, including the execution of software stored on the computer-readable medium/memory 506. The software, when executed by the processor 504, may cause the processing system 502 to perform various functions described supra for any particular apparatus and/or system. The computer-readable medium/memory 506 may also be used for storing data that is manipulated by the processor 504 when executing software. The processing system may further include at least one of the components 512, 514, 516, 518, 520. The components may comprise software components running in the processor 504, resident/stored in the computer readable medium/memory 506, one or more hardware components coupled to the processor 504, or some combination thereof. The processing system 502 may be a component of an unmanned aircraft 102, as illustrated in FIG. 1.

The system 500 may further include features for obtaining, using an aircraft, first information associated with an accuracy of signals transmitted by a localizer, obtaining, using the aircraft, second information associated with an accuracy of signals transmitted by a glide slope station, transmitting the first information and the second information to a ground receiver for processing, obtaining location information, transmitting the location information to the ground receiver for processing, obtaining third information associated with an accuracy of signals transmitted by VOR equipment, and obtaining and transmitting fourth information associated with an accuracy of at least one of DME or ADS-B equipment.

The aforementioned features may be carried out via one or more of the aforementioned components of the system 500 and/or the processing system 502 configured to perform the functions recited by the aforementioned features.

Thus, aspects may include a system for performing a method of flight check of one or more navigational aid systems, e.g., in connection with FIG. 2.

The system may include additional components that perform each of the functions of the method of the aforementioned flowchart of FIG. 2, or other algorithm. As such, each block in the aforementioned flowchart of FIG. 2 may be performed by a component, and the system may include one or more of those components. The components may include one or more hardware components specifically configured to carry out the stated processes/algorithm, implemented by a processor configured to perform the stated processes/algorithm, stored within a computer-readable medium for implementation by a processor, or some combination thereof.

Thus, aspects may include a non-transitory computer-readable medium for performing a flight check of one or more navigational aid systems, the non-transitory computer-readable medium having control logic stored therein for causing a computer to perform the aspects described in connection with, e.g., FIG. 2.

In yet another example, aspects presented herein may be implemented using a combination of both hardware and software.

FIG. 6 is a representative diagram illustrating an example hardware implementation for a system 600 employing a processing system 602. The processing system 602 may be implemented with an architecture that links together various circuits, including, for example, one or more processors and/or components, represented by the processor 604, the components 612, 614, 616, 618, 620 and the computer-readable medium/memory 606.

The processing system 602 may be coupled to or connected with a ground receiver in communication with an unmanned aircraft.

The processing system 602 may include a processor 604 coupled to a computer-readable medium/memory 606 via bus 624. The processor 604 may be responsible for general processing, including the execution of software stored on the computer-readable medium/memory 606. The software, when executed by the processor 604, may cause the processing system 602 to perform various functions described supra for any particular apparatus and/or system. The computer-readable medium/memory 606 may also be used for storing data that is manipulated by the processor 604 when executing software. The processing system may further include at least one of the components 612, 614, 616, 618, 620. The components may comprise software components running in the processor 604, resident/stored in the computer readable medium/memory 606, one or more hardware components coupled to the processor 604, or some combination thereof. The processing system 602 may be a component of the ground receiver 118, as illustrated in FIG. 1.

The system 600 may further include features for receiving, from an aircraft, first information associated with an accuracy of signals transmitted by a localizer, receiving, from the aircraft, second information associated with an accuracy of signals transmitted by a glide slope station, receiving, from the aircraft, location information associated with a position of the aircraft, determining the accuracy of the signals transmitted by the localizer based on the first information and the location information received from the aircraft, determining the accuracy of the signals transmitted by the glide slope station based on the second information and the location information received from the aircraft, receiving, from the aircraft, third information associated with an accuracy of signals transmitted by VOR equipment, developing or validating one or more GBAS airport waypoints using integrated GPS based on at least one of the first information, the second information, or the location information, receiving, using the unmanned aircraft, fourth information associated with at least one of a DME or ADS-B equipment, and determining an accuracy of the DME or ADS-B equipment using the fourth information and the location information received from the aircraft.

The aforementioned features may be carried out via one or more of the aforementioned components of the system 600 and/or the processing system 602 configured to perform the functions recited by the aforementioned features.

Thus, aspects may include a system for performing a flight check method for one or more navigational aid systems, e.g., in connection with FIG. 3.

The system may include additional components that perform each of the functions of the method of the aforementioned flowchart of FIG. 3, or other algorithm. As such, each block in the aforementioned flowchart of FIG. 3 may be performed by a component, and the system may include one or more of those components. The components may include one or more hardware components specifically configured to carry out the stated processes/algorithm, implemented by a processor configured to perform the stated processes/algorithm, stored within a computer-readable medium for implementation by a processor, or some combination thereof.

Thus, aspects may include a non-transitory computer-readable medium for performing a flight check of one or more navigational aid systems, the non-transitory computer-readable medium having control logic stored therein for causing a computer to perform aspects of the method described in connection with, e.g., FIG. 3.

In yet another example, aspects presented herein may be implemented using a combination of both hardware and software.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects.

Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A method performed by at least one processor of an unmanned aerial vehicle, UAV, that operates to conduct a flight check of a navigational aid system, the method comprising:
   receiving first signals transmitted by a localizer of the navigational aid system;
   determining first information that indicates an accuracy of the first signals transmitted by the localizer;
   receiving second signals transmitted by a glide slope station of the navigational aid system;
   determining second information that indicates an accuracy of the second signals transmitted by the glide slope station; and
   transmitting the first information and the second information, from the UAV through a wireless communication link, to a ground receiver to test an accuracy of the navigational aid system.

2. The method of claim 1, further comprising:
   determining at least one of location information, speed information, heading information, or altitude information during flight of the UAV; and
   transmitting the at least one of the location information, the speed information, the heading information, or the altitude information determined during the flight of the UAV to the ground receiver.

3. The method of claim 1, further comprising:
   receiving signals transmitted by one of a very high frequency omnidirectional range, VOR, equipment, a distance measuring equipment, DME, a TACtical Air Navigation, TACAN, equipment, or an automatic dependent surveillance-broadcast, ADS-B, equipment;
   determining third information that indicates an accuracy of signals transmitted by the VOR equipment, the DME, the TACAN equipment; and the ADS-B equipment; and
   transmitting the third information from the UAV to the ground receiver.

4. The method of claim 3, wherein the localizer, the glide slope station, and the DME equipment are all part of an instrument landing system (ILS) used when landing an aircraft on a runway.

5. The method of claim 3, wherein determining third information that indicates an accuracy of signals transmitted by one of the VOR equipment, DME, and the ADS-B equipment comprises analyzing a phase difference between the signals transmitted by one of the VOR equipment, DME, and the ADS-B equipment.

6. The method of claim 1, wherein receiving the first signals and receiving the second signals comprises receiving the first signals and second signals during a prerecorded course of a flight of the UAV and performing the determination of the first and second information during the flight of the UAV along the prerecorded course of flight.

7. The method of claim 1, wherein the UAV comprises a drone or a battery-operated quadcopter.

8. A method performed by a ground receiver that operates to conduct a flight check of a navigational aid system, comprising:
   receiving, through a wireless communication link from an unmanned aerial vehicle, UAV, first information that indicates an accuracy of signals transmitted by a localizer of the navigational aid system to the UAV;
   receiving, through the wireless communication link from the UAV, second information that indicates an accuracy of signals transmitted by a glide slope station of the navigational aid system to the UAV;
   receiving at least one of location information, speed information, heading information, or altitude information associated with a position of the UAV;
   determining the accuracy of the signals transmitted by the localizer to the UAV based on the first information and the at least one of the location information, the speed information, the heading information, or the altitude information; and
   determining the accuracy of the signals transmitted by the glide slope station to the UAV based on the second information and the at least one of the location information, the speed information, the heading information, or the altitude information.

9. The method of claim 8, further comprising:
   receiving, through the wireless communication link from the UAV, third information that indicates an accuracy of signals transmitted by very high frequency (VHF) omnidirectional range (VOR) equipment; and
   determining the accuracy of the signals transmitted by the VOR equipment to the UAV based on the third information and the at least one of the location information, the speed information, the heading information, or the altitude information.

10. The method of claim 8, wherein the localizer and the glide slope station part of an instrument landing system (ILS) that guides aircraft during a landing procedure.

11. The method of claim 8, further comprising:
    validating existing ground-based augmentation system (GBAS) airport way-points using an integrated global positioning system (GPS) based on at least one of the first information, the second information, or the at least one of the location information, the speed information, the heading information, or the altitude information.

12. The method of claim 8, further comprising:
    receiving, through the wireless communication link from the UAV, third information that indicates an accuracy of signals transmitted to the UAV by at least one of a distance measuring equipment (DME), a TACtical Air Navigation (TACAN) equipment, or automatic dependent surveillance-broadcast (ADS-B) equipment; and
    determining an accuracy of the DME, the TACAN equipment, or ADS-B equipment based on the third information and the location information received from the from the UAV.

13. The method of claim 8, wherein the UAV comprises one of a drone or a battery-operated quadcopter.

14. An apparatus of an unmanned aerial vehicle, UAV, that performs a flight check of a navigational aid system, comprising:
    a memory; and
    a processor coupled to the memory and configured to:
       receive first signals transmitted by a localizer of the navigational aid system;

determine first information that indicates an accuracy of the first signals transmitted by the localizer;

receive second signals transmitted by a glide slope station of the navigational aid system;

determine second information that indicates an accuracy of signals transmitted by the glide slope station; and transmit, through a wireless communication link, the first information and the second information to a ground receiver to test an accuracy of the navigational aid system.

15. A computer-readable non-transitory storage medium an unmanned aerial vehicle, UAV, that stores computer executable code that causes a processor of the UAV to operate to conduct a flight check of a navigational aid system, the computer-readable non-transitory storage medium comprising code for:

receiving first signals transmitted by a localizer of the navigational aid system;

determining first information that indicates an accuracy of the first signals transmitted by the localizer;

receiving second signals transmitted by a glide slope station of the navigational aid system;

determining second information that indicates an accuracy of the second signals transmitted by the glide slope station; and transmitting the first information and the second information, from the UAV through a wireless communication link, to a ground receiver to test an accuracy of the navigational aid system.

* * * * *